April 7, 1936.  J. E. SOONS  2,036,306
MEANS FOR THE CHANGE-OVER CONTROL OF MOVING PICTURE APPARATUS
Filed Nov. 28, 1932  3 Sheets-Sheet 1
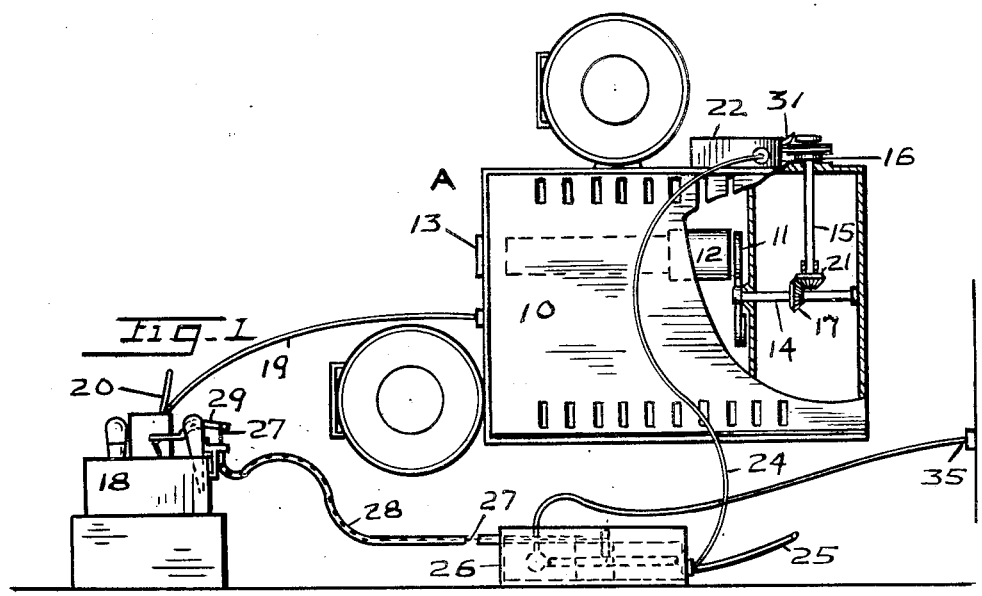
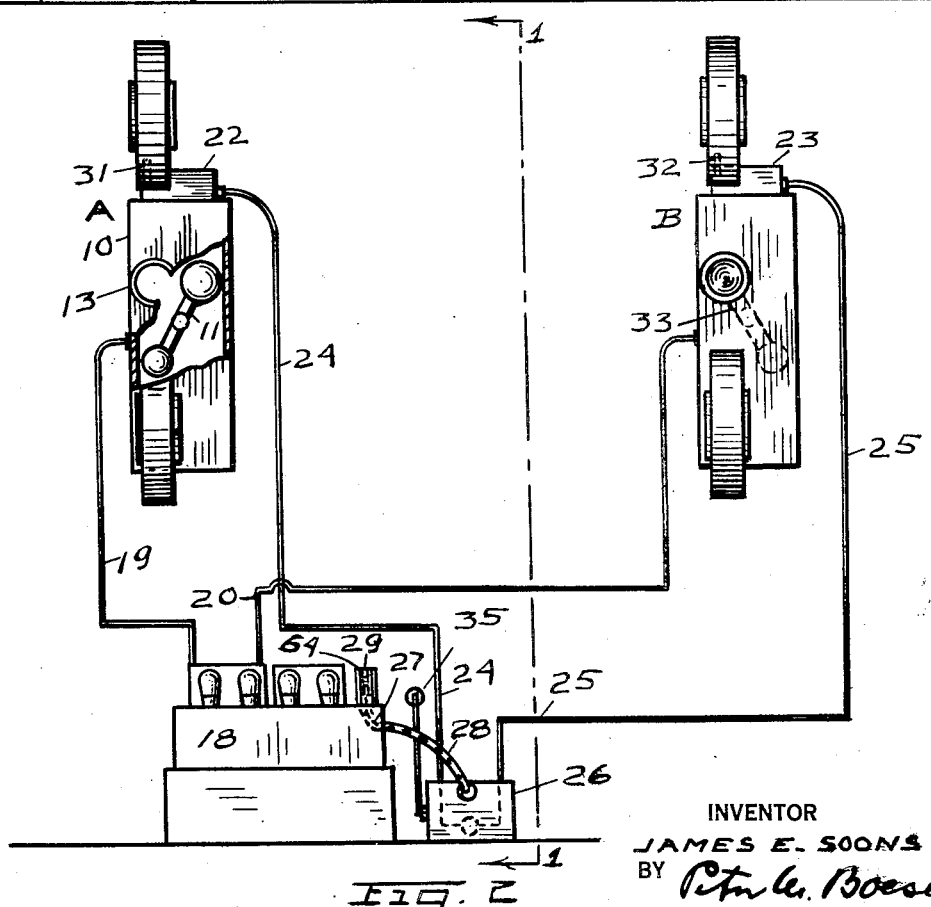
INVENTOR
JAMES E. SOONS
BY
ATTORNEY

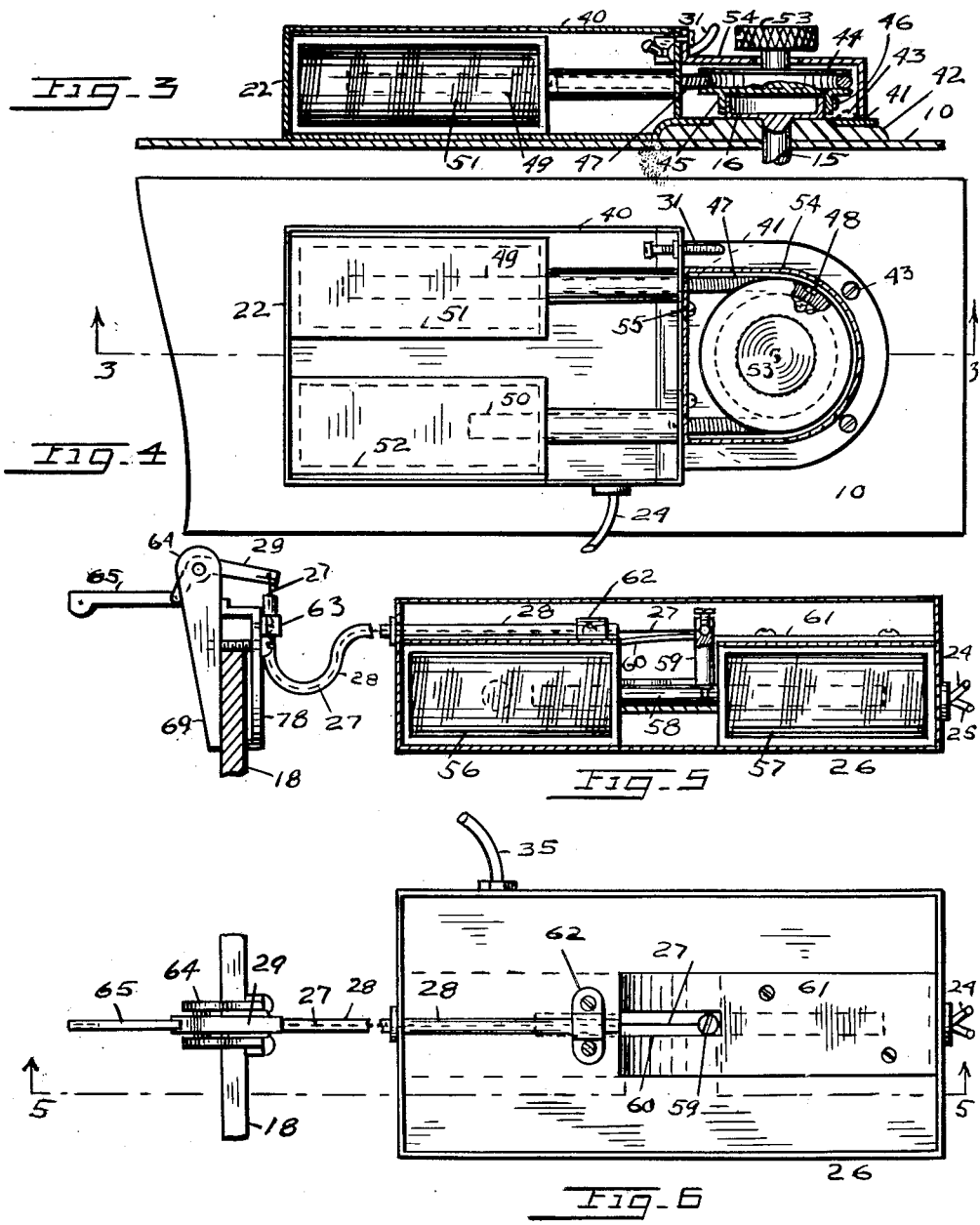

April 7, 1936.   J. E. SOONS   2,036,306
MEANS FOR THE CHANGE-OVER CONTROL OF MOVING PICTURE APPARATUS
Filed Nov. 28, 1932   3 Sheets-Sheet 3
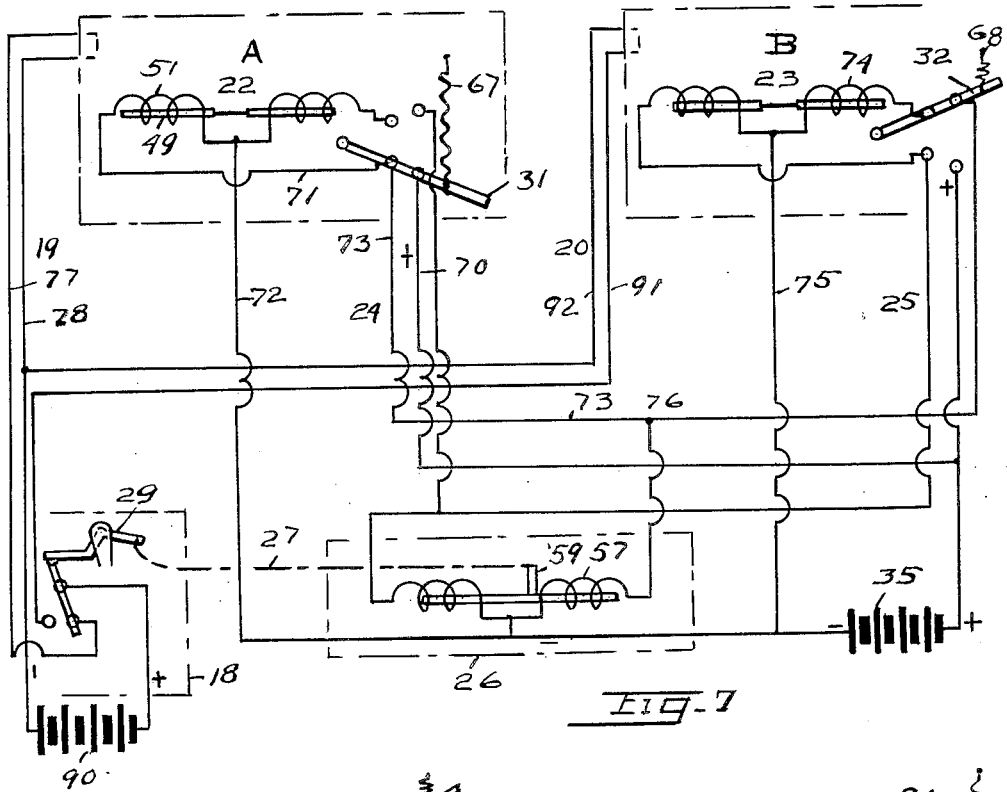
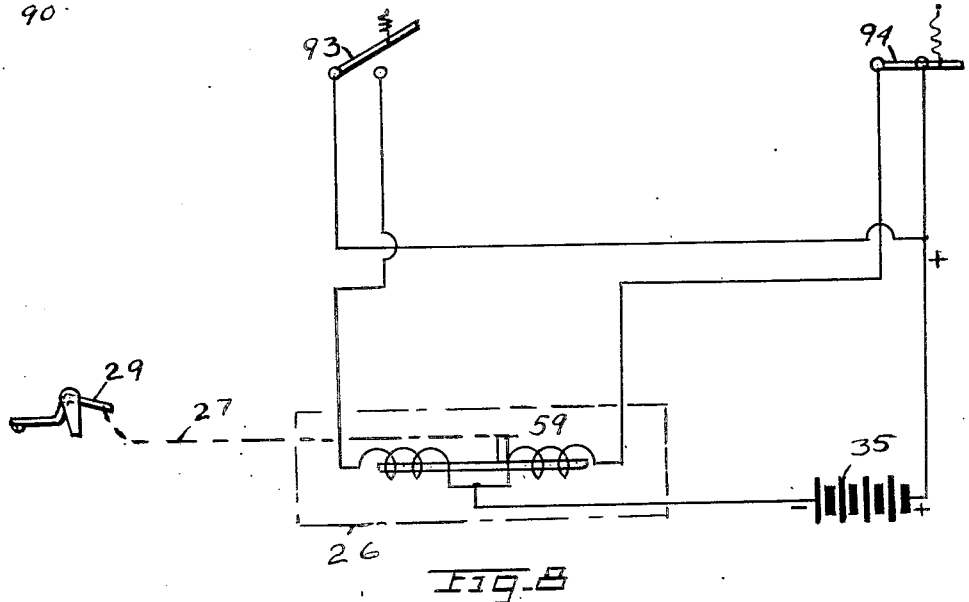
INVENTOR
JAMES E. SOONS
BY
ATTORNEY Patented Apr. 7, 1936

2,036,306

UNITED STATES PATENT OFFICE

2,036,306

MEANS FOR THE CHANGE-OVER CONTROL OF MOVING PICTURE APPARATUS

James E. Soons, Yonkers, N. Y., assignor to Hoffman-Soons Electrical & Engineering Corporation, New York, N. Y., a corporation of New York Application November 28, 1932, Serial No. 644,604

7 Claims. (Cl. 88—16.2)

This invention relates to a means for the change-over control of moving picture apparatus, and particularly to correlated units which operate synchronously, or simultaneously to close a douser shutter in one projector machine and open a similar shutter in another machine and to shift the circuit of a sound amplifier from the shut off projector to the one which is simultaneously opened.

A further object is to provide correlated control units which may be easily attached to standard types of projectors without drilling, cutting or in any way disfiguring the structures of these machines.

Another object is to provide a purely mechanical means between a shift box and the amplifier so that no induction may be set up in the vicinity of the said amplifier such as might occur if the immediate connection were electrical.

The foregoing and other objects and features of the apparatus are fully set forth and described in the following specification and claims and illustrated in the accompanying drawings, in which:

Fig. 1 shows a side view of a projector partly cut away to disclose the douser shutter. A magnetic control unit is shown mounted on the projector casing and connected by electric cable to a shift box which is mechanically connected to a sound amplifier. This view is taken on the line 1—1 of Figure 2.

Fig. 2 shows the front, or lens ends of two projector machines. Control units are shown attached to these machines and both are electrically connected to a shift box. One machine is cut away to disclose an open douser shutter and the other shows a closed shutter in dotted outline. A sound amplifier is shown in the foreground connected mechanically to the shift box.

Fig. 3 shows an enlarged vertical section of a magnetic control unit attached over a douser shutter shaft. This view is a section on the line 3—3 of Figure 4.

Fig. 4 shows a plan view of the control unit of Figure 3.

Fig. 5 shows a vertical section of a shift box having a plunger slidable in opposed magnets and connected by a mechanical slide wire to an amplifier switch. This view is a section on the line 5—5 of Figure 6.

Fig. 6 is a plan view of the shift box of Figure 5.

Fig. 7 is a wiring diagram showing the circuits by which the apparatus functions.

Fig. 8 is a diagram showing the shift box connected in a modified wiring arrangement.

Referring now to Figure 1 of the drawings; a side view of a projector machine 10 which may be designated as machine A, is shown with a portion of the casing cut away to disclose a douser shutter 11 which is adapted to be swung over to shut off the tube 12 which projects its rays through the lens opening 13. The shutter 11 is mounted on a horizontal shaft 14 which has a miter gear 17 in mesh with another gear 21 on a vertical shaft 15 which terminates in a rotatable knob 16. In this view is also shown a sound amplifier 18 which is connected to the projector A by the cable 19.

Referring now to Figure 2 of the drawings; A front view shows two projector machines which are the machine A, already mentioned, and a machine B which is similar in every respect except that A is shown with the shutter open, and B with it closed.

The principal elements of the invention consist of the following: On the projector machines A and B are mounted respectively control units 22 and 23; these units are connected by the cables 24 and 25 to a shift box 26. This box contains opposed magnets which will be described later, and are adapted to act upon a slidable wire 27 passing through a flexible sheath 28 and connected to a rocker arm 29 which is mounted in a bracket clamp 64 attached to the casing of the amplifier 18. The purpose of this slide wire 27 is to actuate the rocker arm 29 which operates the amplifier switch, without bringing any electrical wiring into proximity with the sound mechanism which might, by induction, interfere with the proper functioning thereof.

The view in Figure 2 shows the A machine after the switch 31 has been pressed down. The shutter 11 is open and the sound amplifier 18 is in closed circuit with that machine. A pressure on the switch 32 of the control unit 23 on the B machine would cause the shift box 26 to throw the rocker arm 29 and close the circuit between the amplifier 18 over the cable 20 to the B machine; at the same time, the said control unit 23 would open the shutter 33 of the B machine, and the control unit 22 in circuit with the unit 23 would close the shutter 11 on the A machine. Thus the shutters are operated and the sound current shifted instantly and simultaneously and perfect synchronism is maintained; and this is accomplished by one operator without regard to the distance separating the machines. The source of current for the operating units and the shift box is indicated in the views 1 and 2 at 35.

The details of the mechanism are as follows: Referring now to Figures 3 and 4; a control unit as that shown at 22 is illustrated. This unit has a casing 40 and this casing has an extended flange 41 which fits over a boss 42 on the machine structure 10 and is secured by the screws 43. A grooved pulley 44 has a lower shell 45 which is adapted to fit over the knob 16 of the shaft 15 and may be affixed thereto by the screw 46. A spring coil belt 47 passes partly around the pulley and is attached thereto at 48—see Figure 4. The ends of the coil belt 47 are attached to opposed plungers 49 and 50 which slide within the magnet coils 51 and 52. A two way switch 31 is in circuit with the magnets as will be described later in a wiring diagram. The magnets, when energized, will rotate the pulley and actuate the shaft 15 to open or to close the douser shutters. This may also be done manually by the knob 53. A shield 54 encases the pulley and the belt elements. This is shown in section in both views, the top being removed in Figure 4. It is attached to the casing 40 at 55.

In Figures 5 and 6 the shift box 26 is shown in detail. Referring mainly to Figure 5 it will be seen that the magnets 56 and 57 are in line with each other and a plunger 58 is slidable into either according to the current applied. A vertical stud 59 is mounted in the plunger and slides in the slot 60 of the plate 61. The mechanical slide wire 27 is affixed by a ball tip within the stud 59 and passes through the sheath 28 to the rocker arm 29 on the sound amplifier. The slide wire sheath is attached at 62 to the shift box, and at 63 to the clamp 78. The rocker arm 29 is mounted in the bracket clamp 64 which is attached to the amplifier casing as shown. The reciprocating bar 65 is connectable to throw a switch in the amplifier when actuated by the rocker arm 29. The bracket clamp 64 is attached by means of an extension frame 69 and an L clamp 78.

The wiring diagram in Figure 7 shows the method of operation of the apparatus. In this diagram the machines A and B are indicated in dot and dash lines, as are also the shift box 26 and the amplifier 18. The relative positions of the movable elements are the same as indicated in all of the views. It will be observed that the switches 31 and 32 over the machines A and B are normally in a raised position, being held by the springs 67 and 68. In the diagram the switch 31 is shown depressed, thus connecting the wire 70 which is positive, and passing the current over the wire 71 to energize the magnet 51 from which a negative wire 72 leads back to source. A secondary circuit is also closed on the wire 73 which passes over to the B machine and through the switch 32 to energize the magnet 74 and thence over the wire 75 to source. Simultaneously another circuit passes from the wire 73 at 76 through the magnet 57 which pulls the rocker arm 29 down and connects the sound amplifier 18 over the wire 77 to the A machine, returning over the negative wire 78 to source. The opposite set of circuits is similar to that just described.

The current of the sound amplifier 18 may be from any source such as indicated at 90. The current for operating the control units and shift box is taken from the source indicated at 35.

The diagram in Figure 8 illustrates the shift box 26 in circuit with independent switches 93 and 94 by which it may be caused to throw the switch arm 29; the means 27 between the stud 59 and the said arm 29 being of a purely mechanical nature.

While the invention is herewith shown and described in its preferred form; it is not limited to these exact details, as many obvious minor departures therefrom may be made within the spirit and scope of the appended claims.

Having thus described the invention, what is claimed as new and desired to be secured by Letters Patent of the United States, is as follows:

1. In a motion picture change-over mechanism of the character described the combination of a reciprocating solenoid energized by a remote source of electric power, cables connecting said solenoid to manually operated switches mounted separately one on each of the two motion picture machines, a mechanical slide wire connecting the plunger of said solenoid to a change-over switch on a remotely located sound amplifier, whereby the closing of one of the said switches will change over the program from one machine to the other without the creation of electrical disturbances.

2. In a motion picture change-over mechanism of the character described the combination of a reciprocating solenoid energized by a remote source of electric power, cables connecting said solenoid to manually operated switches mounted separately one on each of the two motion picture machines, a mechanical slide wire consisting of an outside flexible tubing with an axially slidable wire, said mechanical slide wire connecting the plunger of said solenoid to a change-over switch on a remotely located sound amplifier, whereby the closing of one of said manually operated switches will change over the program from one machine to the other without the creation of electrical disturbances.

3. In a motion picture change-over mechanism of the character described the combination of a reciprocating solenoid energized by a remote source of electric power, cables connecting said solenoid to manually operated switches mounted separately one on each of the two motion picture machines, a mechanical slide wire consisting of an outside cylindrical flexible tubing with a coaxial, axially slidable, steel wire, said mechanical slide wire connecting the plunger of said solenoid to a change-over switch on a remotely located sound amplifier, whereby the closing of one of said manually operated switches will change over the program from one machine to the other without the creation of electro-magnetic disturbances.

4. In a motion picture change-over mechanism of the character described the combination of a reciprocating solenoid energized by a remote source of electric power, cables connecting said solenoid to manually operated switches mounted separately, a mechanical slide wire consisting of an outside cylindrical flexible coiled wire tubing with a coaxial, axially slidable, metallic element, said mechanical slide wire connecting the plunger of said solenoid to a change-over switch on a remotely located sound amplifier.

5. In a motion picture change-over mechanism the combination of a plurality of motion picture machines. a manually and electrically operable douser shutter on each of said machines; said douser shutter comprising a horizontal shaft, a shutter disc on said shaft, miter gears connecting said horizontal shaft to a transmission shaft extending to the outside of said motion picture machine, a pulley on said transmission shaft, opposing solenoids operatively connected to said pulley, a knob on said pulley for manual operation; a manually operable switch located at each of said motion picture machines; electric cables connecting said switch and said solenoids to a remote shift box, a polarized electromagnet in said shift box; a remotely located sound amplifier, a mechanical slide wire operatively connected between the plunger of said polarized electromagnet and a change-over switch on said sound amplifier.

6. In a motion picture change-over mechanism such as described in claim 5 where said operative connection between said opposing solenoids and said pulley consists of an elastic coil-spring belt whereby any undue mechanical jerks are eliminated.

7. In a motion picture change-over mechanism such as described in claim 5 where said manually operated switch located on each of said motion picture machines is of the momentary contact type.

JAMES E. SOONS.